US006177384B1

(12) United States Patent
Tsuzuki et al.

(10) Patent No.: US 6,177,384 B1
(45) Date of Patent: *Jan. 23, 2001

(54) IMAGE TRANSFER MATERIAL FOR THERMAL RECORDING

(75) Inventors: Toshihiro Tsuzuki, Kyoto; Masanori Sueoka, Shiga, both of (JP)

(73) Assignee: Toray Industries, Inc. (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/839,625

(22) Filed: Apr. 15, 1997

(30) Foreign Application Priority Data

Apr. 19, 1996  (JP) .................................................. 8-098147

(51) Int. Cl.[7] ........................................................ B41M 5/26
(52) U.S. Cl. ..................... 503/227; 428/474.4; 428/207; 428/195

(58) Field of Search ................................. 428/207, 474.4, 428/195; 503/227

(56) References Cited

U.S. PATENT DOCUMENTS 4,849,287 * 7/1989 Itoh et al. .......................... 428/474.4

* cited by examiner

Primary Examiner—Pamela R. Schwartz
(74) Attorney, Agent, or Firm—Austin R. Miller

(57) ABSTRACT

An image transfer material for thermal recording capable of providing a highly precise printing quality suitable for multiple printing operations comprises a base film having, on one of its surfaces a layer of a colouring material. The base film is made of an aromatic polyamide and has a Young's modulus $E_{MD}$ in the longitudinal direction, measured at 20° C. and at a relative humidity of 60%, of at least 6.86 GPa. The base film is in a substantially flat condition and is capable of maintaining a flat condition after having been heat-treated at 200° C. for 10 minutes in the absence of an applied tension.

12 Claims, No Drawings

IMAGE TRANSFER MATERIAL FOR THERMAL RECORDING

FIELD OF THE INVENTION

The present invention relates to an image transfer material for thermal recording suitable for multiple utilization and excellence in printing quality.

BACKGROUND

Conventional image transfer materials for thermal recording have base films made of, for example, a polyester, polypropylene, cellophane, acetate, polycarbonate or paper, and above all, polyester films. Polyethylene terephthalate (PET) films have been especially widely used.

In recent years, due to the need for a more highly precise printing quality as can be seen in the means for achieving a higher energy transfer efficiency from a thermal printing head, and also due to the increase in the thickness of the coloring material layer to suit multiple utilization, the base is required to be thinner. However, the above mentioned PET base is insufficient in heat resistance and rigidity, and is deformed under tension. Thus, a high modulus base is demanded. From this point of view, the use of a film made of aromatic polyamide having high rigidity is proposed in JP-A-60-174694, JP-A-61-237687 and JP-A-63--107588.

JP-A-04-318034 states that, for an image transfer material for thermal recording using an aromatic polyamide film, if the thermal shrinkage at 200° C. is maintained at 5% or less, the wrinkling caused by film shrinkage can be desirably controlled.

In addition, from the standpoint of environmental protection, in recent years, the movement to allow multiple utilization has also become dominant in the area of image transfer materials for thermal recording. As a multiple utilization technique, a layer of accumulated coloring material is formed inside a coloring material layer or a plurality of coloring material layers are formed, so as to limit the release of coloring material during each of multiple printing stages. In any case, since the amount of the coloring material mounted on the base per surface area of the base must be increased, the base must be thinner to keep the total thickness at less than a certain value.

A recording method which can be employed utilizes a differential running speed mode in which a color receiving sheet and an image transfer material are caused to travel at different respective speeds in order to save the image transfer material used. In this case, since the traveling speed of the image transfer material is low and it is heated longer, the base is required to be higher in heat resistance than hitherto. Furthermore, the difference in traveling speed between the color receiving sheet and the image transfer material causes large friction, and even a slight dimensional change of the image transfer material causes folding and wrinkling, adversely affecting the printing characteristics.

However, due to the modulus of PET, there is a limit as to how thin a PET film can be made. Moreover, it is necessary to have an adhesion preventing layer formed on the head side so as to prevent adhesion; otherwise the film is thermally softened and stuck to the thermal printing head when thermal energy is given from such a head. Furthermore, PET is insufficient in heat resistance and not suitable for the higher printing quality described later.

To meet the need for a higher printing speed, the head must be enhanced in energy density, and as a result, the image transfer material tends to be higher in temperature. Major types of recording methods include the melt transfer type and the dye sublimation type, and it is said that the latter is more advantageous for achieving a higher printing quality by higher precision. However, a dye sublimation type recording method generally requires high energy. Furthermore, while halftone expression is one of the largest factors for requiring higher precision, such techniques as concentrated dot heating method and graded release of coloring material express images by changing the quantity of given energy, and so a material capable of withstanding high energy, i.e., with high heat resistance is required. An aromatic polyamide film is advantageous in having a high modulus and high heat resistance. However, the demand for further higher printing quality increases, and to meet the demand, the image transfer material must be enhanced in rigidity and minimized in thermal dimensional change as far as possible, because it must be thinner for more accurate and efficient energy transfer from the head, and because the productivity in processing into the image transfer material should not be sacrificed.

The increasing practice of color printing and multi-head printing and the adoption of the line head tend to demand wider image transfer materials. Thermal dimensional change, especially its irregularity causes curving and wrinkling, to impair the printing accuracy and printing quality, and this has a remarkably adverse effect in wider image transfer materials.

In relation to the problem of thermal dimensional change, JP-A-04-318034 mentioned above simply states that the thermal shrinkage should be preferably kept at 5% or less, and contains no disclosure as to how to specifically realize this, nor does it present any discussion or give technical data concerning thermal dimensional change. Moreover, JP-A-61-237687, also mentioned above, describes a case in which an image transfer material limited in thermal shrinkage is obtained by using an aromatic polyamide with a special structure, but does not refer to the in-plane irregularity of thermal dimensional change caused by a limit to the control applied in the production of aromatic polyamide film (solution casting), and as can be seen from the respective examples described in the patent gazette, such a special structure is insufficient in Young's modulus, necessitating the use of a thick film only, and also results in poor printing characteristics.

SUMMARY

The present invention addresses the problem of providing an image transfer material for thermal recording, especially suitable for multiple utilization and excellent in printing quality and processability, and seeks to provide a solution to this problem by controlling Young's modulus and irregularity of thermal dimensional change without impairing the heat resistance and mechanical properties peculiar to aromatic polyamides.

In accordance with a first aspect, the present invention provides an image transfer material for thermal recording comprising a base film and, on one surface of the base film, a layer of colouring material, which base film comprises an aromatic polyamide and has a Young's modulus $E_{MD}$ in the longitudinal direction, measured at 20° C. and at a relative humidity of 60%, of at least 6.86 GPa, and which base film is in a substantially flat condition and is capable of maintaining a substantially flat condition and is capable of maintaining a substantially flat condition after heat treatment thereof at 200° C. for 10 minutes in the absence of an applied tension.

According to a second aspect, the present invention provides a process for preparing an image transfer material for thermal recording, which process comprises the steps, carried out in an appropriate order, of (1) forming a solution of an aromatic polyamide in a first, casting solvent,
(2) discharging the solution from a die exit onto a support to form thereon a film,
(3) optionally subjecting the film to a dry heat and/or wet heat treatment,
(4) optionally removing the film from the support,
(5) treating the film with a second, extraction solvent so as to extract from the film any first, casting solvent and/or salt remaining in the film,
(6) thermally setting the film; and
(7) forming on the film a colouring layer; characterised in that
  (a) during step (2), at any two optionally selected points near, and upstream of, the die exit and spaced apart from one another in a transverse direction, the difference in temperature is controlled to be no more than 10° C. and/or the thickness irregularity is controlled to be no more than 10%;
  (b) during each of steps (3) and (6), the temperature and/or water vapour content are controlled such that, at respective points near the film and spaced apart from one another in a transverse direction relative to the film, any irregularity in the temperature and/or water vapour content is no more than 5%;
  (c) during step (5), the second, extraction solvent in contact with the film is in a moving condition relative to the film; and
  (d) subsequently to step (5) and prior to step (6); the second, extraction solvent is removed from the film.

According to the present invention, since the Young's modulus in the longitudinal direction is enhanced, the film has a modulus necessary for obtaining a thinner recording material, and since the thermal dimensional behavior in all directions is controlled within specific values and since the dimensional change irregularity is also controlled, the wrinkling, folding, etc. caused especially remarkably in a wider conventional film are not caused to realize a highly precise printing quality. The present invention is especially suitable for recording using a thermal head, but can also be used for recording using any other heating means instead of the thermal head, for example, heated plate, laser beam, and heat generation in the base film.

DETAILED DESCRIPTION

Preferred embodiments of the invention will now be described.

The aromatic polyamide in the present invention may contain the component(s) represented by the following general formula (I) and/or general formula (II):

General formula (I)

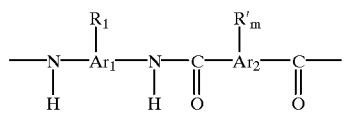

General formula (II)

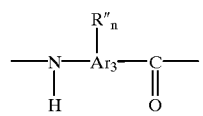

(where $Ar_1$, $Ar_2$ and $Ar_3$ stand for, respectively independently, an aromatic nucleus; R, R' and R" stand for, respectively independently, a functional group selected from halogen atoms, nitro group, cyano group, alkyl groups with 1 to 4 carbon atoms, alkoxy groups with 1 to 3 carbon atoms, trialkylsilyl groups, hydroxyaryl groups, thioaryl groups, and aryl groups; and l, m and n stand for, respectively independently, an integer of 0 to 4) preferably in an amount of 50 mol % or more, more preferably by 70 mol % or more, based on total polyamide.

In the above, $Ar_1$, $Ar_2$ and $Ar_3$ can be, for example, selected from those represented by the following general formulae (III):

General formulae (III)

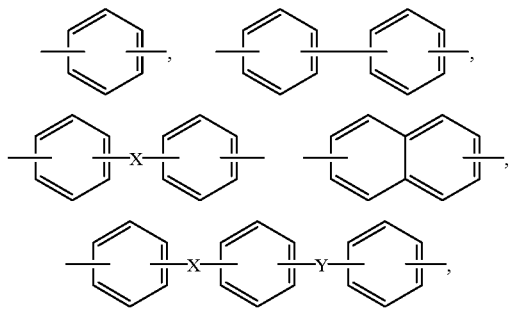

where X and Y can be selected from, for example, —O—, —$CH_2$—, —CO—, —$SO_2$—, —S— and —$C(CH_3)_2$—.

A preferred polymer contains 50 mol % or more, more preferably 75 mol % or more, of an aromatic polyamide having aromatic rings bonded at respective para-positions. Such a polymer is preferred because the film obtained is high in rigidity and good in heat resistance.

References herein to a "para-position" mean that the bonds at the main chain of an aromatic ring are located at respective para-positions, or that the main chain directions at both the ends of two or more aromatic rings are axial or parallel. Examples of such aromatic rings can be represented by the following general formulae (IV):

General formulae (IV)

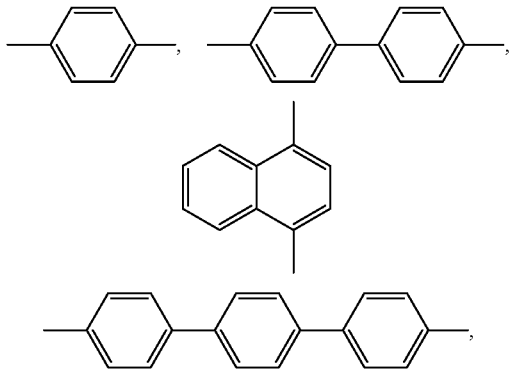

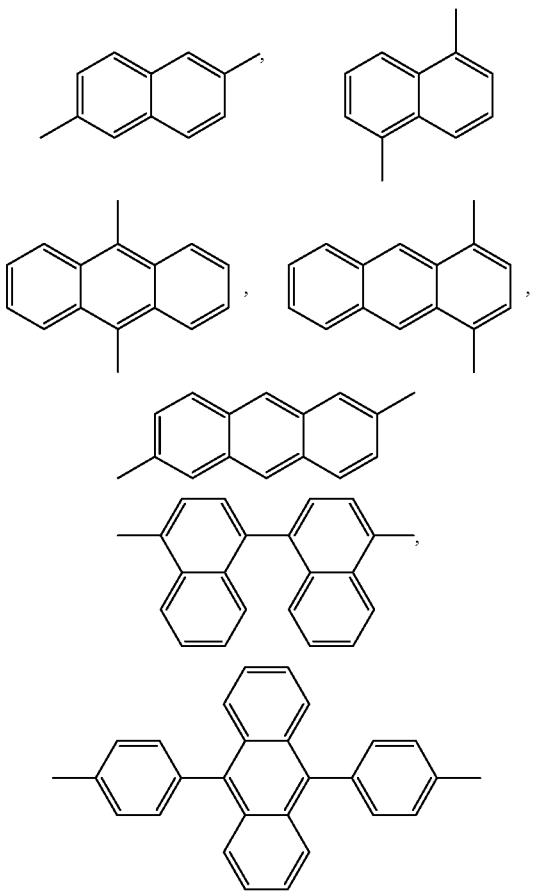

The aromatic polyamide preferably contains at least 50 mol % of the component(s) represented by the general formula (I) and/or general formula (II), and can be copolymerized or blended with less than 50 mol % of other components such as aromatic polyimide components and aromatic polyamideimide components insofar as desired properties obtainable in accordance with the present invention are not unacceptably impaired.

To improve the characteristic under fluctuation of humidity, some of the hydrogen atoms of these aromatic rings can be preferably substituted by such substituent groups as halogen atoms (preferably chlorine), nitro groups, alkyl groups with 1 to 4 carbon atoms (preferably methyl groups), and alkoxy groups with 1 to 3 carbon atoms (preferably methoxy groups) denoted by R, R' and R" in the general formula (I) and/or general formula (II). The values of l, m and n in the general formula (I) and/or general formula (II) are optional, but it is practical that l+m is 1 to 4, preferably 2 to 4 and l>0 and m>0 in the general formula (I). If l+m is 5 or more, the film is likely to be undesirably fragile. In the general formula (II), it is practical that n is 0 to 2, preferably 1 to 2. Among the substituent groups which can be introduced, chlorine, methyl groups and methoxy groups are preferred because there is hardly any decline in mechanical properties. In view of the excellent wet heat resistance which may be achieved, with hardly any decline in elongation, chlorine is more preferable. However, if the generation of a halogen compound or nitrogen compound due to thermal decomposition, etc. is feared, it is preferable that the amount of aromatic rings substituted by halogen atoms or nitro groups is less than 15% of all the aromatic rings.

Considering the influence on the thermal head, the base film used in the present invention should contain less ionic impurities, preferably 300 ppm or less, more preferably 100 ppm or less, still more preferably 10 ppm or less, especially in the content of the ions of IA, IIA and VIIB group elements of the periodic table, particularly the content of the ions of IA and IIA group elements. The ionic impurity content can be measured by the amount extracted by heating the base film in hot water under reflux for 24 hours. An ionic impurity impermeable material can be preferably used to partially or entirely cover the base film, to keep the ionic impurity content within this range, and it is preferable that the layer also serves as a mat layer, an anchor layer or a sticking preventing layer, as described later. To decrease the ionic impurity content in the base, it is important to select the purities of the raw materials, additives, catalyst and polymerization conditions properly, and the decrease can also be achieved by the method described later for the film production step.

The base film used in the present invention preferably has a content of no more than 0.5 wt %, more preferably no more than 0.2 wt % of oligomer having a molecular weight of 1000 or less. Thus, such oligomers may be produced during the process for producing the aromatic polyamide and may contain some of the residues also present in the aromatic polyamide, and may also contain, for example, reaction products formed with the solvent, etc. If the oligomers remain in the base in a large amount, they may ooze out during use, to lower the adhesivity to the coloring material layer, etc. formed on the surface of the base, causing delamination and lowering the printing quality. Furthermore, the base film is likely to be caught around rolls, etc. to cause folding and wrinkling. If the weight average molecular weight is Mw and the number average molecular weight is Mn, then the aromatic polyamide of the base film used in the present invention preferably satisfies the following formula:

$$Mw/Mn \leq 4.5$$

more preferably $$1.2 \leq Mw/Mn \leq 3.5$$

In general, since an aromatic polyamide is produced by polymerization in a heterogeneous system, the molecular weight distribution is likely to be broad, but an aromatic polyamide satisfying the above formula may provide a base film which is very good in film formability and good in heat resistance.

The base film used in the present invention has a Young's modulus $E_{MD}$ in the longitudinal direction, measured at 20° C. and at a relative humidity of 60%, of 6.86 GPa or more, preferably 7.84 GPa or more, more preferably 8.82 GPa or more. If the Young's modulus is in this range, the film has sufficient strength in the longitudinal direction even if it is thin, and can withstand the tension applied during processing and use, not being lowered in printing quality.

Furthermore if the Young's modulus of the base film in the transverse direction, measured at 20° C. and at a relative humidity of 60% is $E_{TD}$, the base film preferably satisfies the following formulae:

$$E_{MD} \geq E_{TD} \times 1.1$$

$$E_{TD} \geq 6.86 \text{ GPa}$$

more preferably $$E_{MD} \geq E_{TD} \times 1.1$$

$$E_{TD} \geq 7.84 \text{ GPa}$$

still more preferably $$E_{MD} > E_{TD} \times 1.2$$

$$E_{TD} \geq 7.84 \text{ GPa}$$

If the respective Young's modulus are controlled in these ranges, the base film withstands the stresses acting during processing, is excellent in slittability, and less likely to be flawed at the cut face of the base, and can provide an image transfer material with excellent durability. On the other hand, if $E_{TD}$ is less than 6.86 GPa, the stiffness in the transverse direction is insufficient, and wrinkling is likely to occur. As a result, during production of image transfer material or during transfer recording, the base film may be cut or the printing quality may decline. In addition, since the base film is usually too intensively oriented in the longitudinal direction in such a case, the elongation may decline or cutting or tearing may occur.

Furthermore, the base film used in the present invention preferably has a dimensional stability such that, after heat treatment at 200° C. for 10 minutes in the absence of an applied tension, the % dimensional change is 2% or less, more preferably 1% or less, still more preferably 0.5% or less. Since the image transfer material is used without being tensioned especially in the transverse direction, it is likely to be affected by thermal dimensional change. If the % dimensional change exceeds 2%, the base film used in the image transfer material is dimensionally changed by the heat of the thermal head, and may be wrinkled to be useless as a product. Especially in full color printing using a line head, since a structure in which four coloring materials of yellow, cyan, magenta and black, for example, are arranged in parallel toward the transverse direction is often adopted, the area becomes inevitably large. In such a case, if thermal dimensional change occurs, the positional accuracy is poor, and especially the printing quality at the ends of a printed sheet declines.

After the base film has been treated at 200° C. for 10 minutes, the base film must remain substantially flat. The "flatness" is evaluated by placing the heat treated base film on a flat surface, and calculating the ratio of the area in contact with the flat surface to the overall area. For a film to be substantially flat, this ratio is 60% or more. It is preferable that the ratio is 70% or more, more preferably 80% or more. However, if the base film is slender, i.e. less wide, the "flatness" is evaluated in terms of a curve ratio of the base film as later described. For a film to be substantially flat, this curve ratio is 2% or less. It is preferable that the ratio is 1.5% or less, more preferably 1% or less. An aromatic polyamide film is usually obtained by solution casting, but conventional films obtained by solution casting are disadvantageously irregular in their physical properties in the in-plane direction. If a film with such an disadvantage is used as a base film, the image transfer material is likely to be wrinkled even by slight thermal shrinkage to lower the printing quality when it has a large area as mentioned before.

If the base film used in the present invention has an elgongation of 10% or more, preferably 20% or more, more preferably 30% or more, it is especially excellent in toughness and has moderate flexibility.

The base film used in the present invention can be relatively thin because it has a high Young's modulus. However, the thickness can be preferably 0.5 to 20 μm, more preferably 1 to 10 μm, still more preferably 2 to 8 μm, especially preferably 3 to 7 μm to suit respective applications. If the thickness is too large, energy cannot be precisely transmitted, to lower the printing quality, and if it is too small, the base film is likely to be deformed by stress.

The base film used in the present invention can also be a laminate film made of the same polymer or different polymers. Furthermore, it is preferable that the laminate film also satisfies the above mentioned properties.

The base film of the present invention can preferably contain particles for various purposes such as achieving more stable travelling and higher energy transfer speed.

The particles include, though are not limited to, inorganic particles for example $SiO_2$, $TiO_2$, TiN, $Al_2O_3$, $ZrO_2$, $CaCO_3$, $CaSO_4$, $BaSO_4$, talc, zeolite or other metallic fine powder, and organic particles of carbon black, crosslinked polystyrene resin. However, colored particles, not white, such as carbon black are not preferable since they contaminate the head or printing surface during travelling. Furthermore, too hard particles undesirably abrade the head.

The amount of the particles contained in the film is preferably 0.01 to 40 wt %, more preferably 0.05 to 10 wt %.

Furthermore, as described later, it is preferable that the base film has opposite surfaces of respective different surface roughnesses, and it is preferable to prepare the base film by laminating at least two or more layers using polymers different in chemical composition or higher order structure or containing particles different in, for example, particle size or hardness.

If the base film has a moderate roughness on the surface on which the coloring material layer is not formed, better travelling can be ensured, and the center average roughness Ra of the surface measured according to JIS B 0601 1976 (cutoff: 0.25 μm) is preferably 2 to 700 nm, more preferably 10 to 500 nm, still more preferably 20 to 400 nm. If the roughness is less than 2 nm, good travelling may not be able to be ensured, to lower the printing quality. If more than 700 nm, the air layer formed between the image transfer material and the head may lower the energy transfer efficiency so that the energy is irregularly transferred, thus lowering the printing quality. On the other hand, if the base film also has a moderate roughness on the surface bearing the coloring material layer, good travelling can be ensured without contaminating the color receiving sheet due to friction with the color receiving sheet. The center average roughness Ra of the surface is preferably 3 to 300 nm, more preferably 10 to 200 nm. If the roughness exceeds 300 nm, the transfer position accuracy may decline to lower the printing quality.

The image transfer material of the present invention can be applied to either melt transfer type printing or dye sublimation type printing. Thus, the coloring material layer can contain any known pigment or dye, and, as required, a binder resin selected from known waxes such as paraffin, carnauba wax and esters, and various polymers. Furthermore, between the base film and the coloring material layer, a layer of acrylic resin, urethane resin or polyester resin, etc. can be formed, which may contain additives such as an antistatic agent. Moreover, on the surface opposite to the surface on which the coloring material layer is to be formed, a back coat layer can be preferably formed for better travelling. The back coat layer can be made of a wax such as carnauba wax or an ester, thermosetting resin, silicone resin or fluorine resin or any of these resins containing a surfactant.

Since the present invention uses an aromatic polyamide excellent in heat resistance, and keeps the image transfer material substantially flat even at high temperature, it is suitable for use as an image transfer material for dye sublimation type thermal recording, especially for application as an image transfer material for thermal recording adopting the above mentioned multiple utilization technology. Furthermore, it can be excellently applied as a wider image transfer material. It is suitable for application as an image transfer material with a width of preferably 100 mm or more, more preferably 200 mm or more, still more preferably 250 mm or more, and for printing on a JIS standardized size A4 or B4 or larger sheets of paper adopting a line head. There is no special upper limit to the width, and the width is limited only by the restriction in printer design.

Processes embodying the present invention are now specifically described below.

The method for obtaining an aromatic polyamide can be, for example, low temperature solution polymerization, interfacial polymerization, melt polymerization or solid phase polymerization. To obtain the base film to be used in the present invention, solution polymerization, especially low temperature solution polymerization is suitable for obtaining a highly rigid base film.

The solvent for polymerization can be any known solvent, for example, aprotic organic polar solvent such as N-methylpyrrolidone (NMP), dimethylacetamide (DMAc) or dimethylformamide (DMF). In this case, it is preferable that impurities such as water in the solvent are removed as far as possible for inhibiting the production of oligomers. Furthermore, as a dissolving aid, lithium chloride, lithium bromide or calcium chloride, for example, can also be added. Then, monomers (e.g., a diamine and diacid chloride) are added. In this case, if the acid chloride is added in portions, the heat generation can be controlled to prevent the production of oligomers, but the molecular weight distribution tends to be broad. To obtain an aromatic polyamide higher in degree of polymerization, it is very important to use the diamine and acid chloride in equal amounts, but when it is necessary to adjust the polymerization degree, it is preferable to use the diamine excessively because of excellent thermal stability. Furthermore, benzoyl chloride, for example, can also be preferably used for blocking the ends.

It is preferable to use a reactor which allows stirring as efficiently as possible. The reaction to produce an aromatic polyamide is usually very exothermic. Therefore, it is preferable to stir at a high speed in the beginning of polymerization. On the other hand, according to the increase of degree of polymerization, the viscosity rises, and in this case, on the contrary, high speed stirring is not efficient. To prevent the production of oligomers, it is preferable that the reactor has a mechanism to adjust the stirring speed in relation to the degree of polymerization (viscosity). If this means is optimized, a high degree of polymerization and a small dispersion degree can be achieved, and the value obtained by dividing the number average molecular weight by the weight average molecular weight can be kept at 4.5 or less, preferably at 1.2 to 3.5 desirably as the aromatic polyamide film.

If the polymer solution contains an acid such as hydrogen chloride, it can be neutralized by an inorganic neutralizing agent such as calcium hydroxide, calcium carbonate or lithium carbonate, or an organic neutralizing agent such as ethylene oxide, propylene oxide, ammonia, triethylamine, triethanolamine or diethanolamine. In general, any of these neutralizing agents can act as an impurity component to lower the printing quality, but as described later, the impurity component can be effectively removed by optimizing the film formation step.

The polymer solution can be used directly as a raw solution for film formation, or the polymer can be once isolated from the solution and re-dissolved into any of the abovementioned organic solvents or an inorganic solvent such as sulfuric acid, for use as a raw solution for film formation. The polymer concentration is preferably for 2 to 40 wt %.

To obtain an aromatic polyamide suitable for the present invention, the inherent viscosity of the polymer (value measured as 100 ml of sulfuric acid solution containing 0.5 g of the polymer at 30° C.) is preferably 0.5 or more.

The method for adding particles is not especially limited, but for adjustment of the degree of agglomeration and control of coarse protrusion formation, the particles can be, for example, dispersed in a solvent having a viscosity of 10 poises or less, preferably 1 poise or less. The solvent used is preferably the same as that used for film formation, but if there is no adverse effect, any other solvent can also be used. For the solvent, additives such as a dispersion aid can also be used as far as the dispersion is not adversely affected. The particles are dispersed by using a stirring dispersion apparatus, ball mill, ultrasonic dispersion apparatus, etc., to adjust the particle size and degree of agglomeration.

The dispersed particles are mixed with the polymer solution. In this case, the particles can be added into the solvent before polymerization, or added after completion of polymerization, or added while the polymer solution is prepared, or added before casting. It is important for ensuring good running property and printing quality that the particles are dispersed homogeneously in the raw solution.

The raw solution for film formation prepared as above is formed into a film by so-called solution casting. The solution casting can be any of a dry-wet process, dry process or wet process etc., but the dry process is not preferred because the non-volatile impurities including ionic impurities cannot be removed.

For film formation, at first, the raw solution is extruded from a die onto a support such as a drum or endless belt made of, for example, nickel, stainless steel, copper, titanium, Hastelloy or tantalum, to form a thin film. In this case, the temperature difference between two optionally selected points near the die exit is controlled within 10° C., preferably within 6° C., more preferably within 4° C., and/or the discharged thickness irregularity is controlled within 10%, preferably within 5%, more preferably within 2%. Without such control, the solvent drying, solvent extraction behavior and gel film drying behavior in later steps become uneven, and the physical properties (especially thermal dimensional change) in the in-plane direction become uneven. Measures taken for the control include control of die shape and the interval of the die lips, keeping the whole of the die in a constant temperature atmosphere close to the temperature of the polymer solution, and installing a sensor in the heater heating the die for temperature control.

Subsequently the solvent is evaporated from the film and, as required, treated in a dry or wet state until the film retains its form. The film can be dried, for example, at room temperature to 250° C. within 60 minutes, preferably room temperature to 200° C. If the temperature is higher than 250° C., the surface may be roughened to lower the printing quality. In this case, the drying in the transverse direction of the film should be kept constant, and the difference in temperature between points spaced apart in the transverse direction of the film should be kept within 5%, preferably within 3%. When the film is treated in a wet atmosphere, it is passed through an atmosphere of at least 50° C. and 70% or more in relative humidity, or a gas of this condition is blown onto the film, to be absorbed by the film. In this case, in the treatment box, the difference in water vapor content near the film between points spaced apart in the transverse direction of the film is kept within 5%. Without such control, the physical properties (especially thermal dimensional change) in the in-plane direction become uneven. For the control, such measures as using a sufficiently large treatment box and keeping the heater or steamer somewhat higher in output at the edges of the film are taken.

Then, the film is introduced into an extraction solvent for removal of any remaining solvent for the polyamide and/or salt. This extraction step may be carried out after the film has been removed from the support or as it is carried by the support. For effective extraction of impurities in the solvent and salt removing step, it is preferable that the polymer concentration of the film in the extraction solvent is as low as possible as far as the film is able to retain its form. If the polymer concentration is not more than 50%, the object can be easily achieved. From the film removed from the support, salts and solvent are removed, and it is furthermore stretched, dried and heat-treated.

In the present invention, the extraction step in which the solvent and salt are removed and the stretching and heat treatment step play important roles. In the extraction step, water can be used as the extraction solvent, but a mixed solvent consisting of water and an organic solvent, or an aqueous solution of inorganic substance can be a suitable extraction solvent. The organic solvent in this case must be soluble in water and preferably an aprotic organic polar solvent such as N-methylpyrrolidone (NMP), dimethylacetamide (DMAc) or dimethylformamide (DMA), like the solvent for polymerization. In the extraction step, the solvent and salts in the film are extracted, but if the extract stays near the film, the extraction efficiency is not constant, to make the physical properties of the film uneven in later steps. For the control of the extraction step in a process embodying present invention, a circulator or blower may be installed in order that a forcibly formed flow exists on the surface of the film to minimize the difference of bath composition concentration near the film. Furthermore, the travelling film entrains air, and if bubbles so formed are deposited on the surface of the film and introduced into the bath, the extraction behavior becomes different in certain portions, to make the physical properties of the film uneven. Thus, as required, a guide is installed in the bath near the inlet of the film, to remove the bubbles. If a plurality of baths different in bath composition are used, ionic impurities and other unnecessary additives can be discharged outside the system, to provide a more suitable film. If the temperature is lower, a more compact film can be obtained, but if the bath composition is appropriate, it is preferable to use a higher temperature in order to shorten the time of extraction as far as the desired properties of the film are not impaired.

The gel film coming out of the solvent and salt extraction step is then introduced into the stretching and heat treatment step. If the film is introduced with the solvent still deposited on the surface, uneven thermal dimensional change is caused. Thus, in a process embodying the present invention, the film coming out of the solvent and salt extraction step has the deposited solvent removed by a mechanical means such as nip rolls, a roll with a suction means, or a scraper, or, if the deposited amount is small, by passing the film along a hot plate at about 100° C. or through an atmosphere at about 100° C., before stretching and heat treatment. The stretching ratio is preferably 0.8 to 5.0 times, more preferably 1.0 to 3.5 times in area ratio (the area ratio refers to the value obtained by dividing the area of the non-stretched film by the area of the stretched film; a value of 1 or less signifies relaxation). In this case, if the film is stretched at a larger ratio in the longitudinal direction, the desired Young's modulus can be secured. Furthermore, if the film is heat-treated and relaxed at 200° C. to 500° C., preferably 250° C. to 400° C. for several seconds to several minutes, mechanical properties, thermal properties, % thermal dimensional change, and in-plane dimensional change irregularity are improved. If the heat-treated film is gradually cooled, % thermal dimensional change and in-plane dimensional change irregularity are further improved. It is effective to cool at a rate of 50° C./sec or less. In a process embodying the present invention, in stretching and heat treatment, the difference in temperature at points near the base film spaced apart in the transverse direction is kept within 5%. Without such control, thermal dimensional change irregularity is caused because the film is stretched or crystallized more at portions high in temperature, though the % thermal dimensional change of the film as a whole is in the preferable range of the present invention. For achieving such control, in a process embodying the present invention, such measures as using a sufficiently large heat treatment box and keeping the heater somewhat higher in output at the ends of the film are taken. Moreover, a heating means such as induction heating or infrared heating can be used.

A film embodying the present invention can also be a laminate film. For example, in the case of two layers, the polymerized aromatic polyamide solution can be divided into two parts, and, as required, respective different types of particle can be added to the two parts of the solution, for subsequent lamination. In the case of three layers, a similar procedure can also be taken. Such a laminate can be produced by any known method, for example, by laminating in a die, laminating in a lamination pipe, or laminating a layer onto another layer formed beforehand. In the case of a laminate film consisting of different components, it is preferable that the respective layers satisfy the discharged thickness irregularity condition mentioned before.

On the obtained base film, a layer of coloring material and any other layer which may be desired are formed.

A hot melt type coloring material is prepared by mixing a coloring material and a meltable binder such as EVA, paraffin wax or carnauba wax. As coloring materials, in addition to coloring materials for forming cyan, magenta, yellow and black, a coloring material of any other color can also be used. An appropriate amount of each coloring material applied can be optionally decided to suit each purpose, but the layer of colouring material is preferably 3 to 20 μm in thickness for stable high quality printing.

A dye sublimation type coloring material is obtained, for example, by dispersing or dissolving a dye such as an anthraquinone based dye, azo based dye, naphthoquinone based dye, polymethylene based dye, triphenylmethane based dye, phenoxazine based dye, Leucoauramine based dye or spiropyran based dye (it is preferable to use a disperse dye) and a binder such as polyvinyl butyral, polysulfone, polycarbonate, polyphenylene oxide or cellulose based material, and other additives into a solvent. An appropriate amount of each coloring material applied can be decided optionally to suit each purpose, but the layer of colouring material is preferably 0.5 to 20 μm in thickness.

As a means to allow a multiple printing operation, any conventional method can be used. For example, a binder with a thermal softening point higher than the melting point or the sublimation initiation temperature of the coloring material and low in affinity to the coloring material can be used for forming the layer of coloring material, or very highly cohesive particles can be added to form the layer of coloring material.

An anchor layer can be optionally formed. The anchor layer can be formed by using a resin good in adhesion to the layer of coloring material, selected from conventionally known resins.

A mat layer can also be optionally formed. The mat layer can be formed by using a material good in heat resistance and thermal releasability, selected from conventionally known materials, and if the thickness of the mat layer is about 0.1 to about 3 µm, as is preferred, heat sensitivity is good.

The resin used for forming the mat layer can be, for example, a synthetic resin with a glass transition temperature of 60° C. or higher such as an acrylic resin, polyester resin, phenol resin, fluorine resin, polyimide resin or silicone resin, or a resin obtained by adding a compound with two or more amino groups or di (or tri) isocyanate to a thermoplastic resin with OH groups or COOH groups.

Furthermore, any of the resins can contain a thermal releasing agent and lubricant which can be selected from waxes such as polyethylene wax and paraffin wax, amides, esters and salts of higher fatty acids, phosphates of higher alcohols and lecithin, Teflon®, fluorine resins such as polyvinyl fluoride, guanamine resin, silica, talc, calcium carbonate, magnesium carbonate, precipitated barium sulfate, alumina, acid clay, titanium white and carbon black.

The anchor layer and the mat layer can be formed by dissolving or dispersing their ingredients into suitable solvents, to prepare solutions or dispersions with a viscosity suitable for coating, and applying them by conventional coating means.

Furthermore, on the thermal head side, as required, a sticking preventing layer may be formed. Its ingredients and forming method can be selected as described for the mat layer, and the layer can further contain an electrically conductive material and coloring additives. Furthermore, for better running property, its coefficient of dynamic friction with glass is preferably 1.0 or less, and can be adjusted, for example, by selecting the kinds, sizes and contents of ingredients such as lubricant contained in the base film or adhesion preventing layer and thickness.

Films embodying the present invention are suitable for recording using a thermal head, but can also be used for recording by such means as a hot plate, laser beam, or heat generation in the base film.

EXAMPLES

Methods for measuring the physical properties and methods for evaluating properties and effects of films embodying the present invention were as described below. In the following Examples, the physical properties (1) to (5) were obtained by measuring the samples taken from the base portions of the image transfer materials obtained by processing raw base films as described in (6). The testing lengths and widths of the base films were decided for the sake of convenience, and are essentially irrelevant to physical properties, as can be easily inferred.

(1) Tensile elongation and Young's modulus

An Instron type tensile testing machine was used for measurement. The test pieces were 10 mm in width and 50 mm in length, and the tensile speed was 300 mm/min. For sample preparation, a thermo-hygrostat was used, and samples conditioned at 20° C. and 60% RH for 48 hours were used and measured quickly after having been taken out of the thermo-hygrostat.

(2) % Thermal dimensional change

Each base film was cut to have a width of 10 mm and a length of 250 mm, and marked at 25 mm from both ends, to prepare a test piece with a testing length of 200 mm. It was introduced into an oven kept at 200° C., without tension, heated for 10 minutes, and allowed to cool. The length was measured, and the % thermal dimensional change was calculated from the following formula. The value in the longitudinal direction or the value in the transverse direction, whichever was larger, was adopted as the % thermal dimensional change.

Thermal dimensional change (%)=100×(Length before heating (mm)−Length after completion of heating (mm)/(Length before heating (mm))

(3) Flatness after heat treatment

A base film of at least 500 cm² (sampled to be as square or circular as possible) was heat-treated as described in (2) above, and the heat treated base film was spread over thick "ECSAINE" (produced by Toray Industries, Inc.) spread on a flat plate, using a brush. Then, the swollen portions not in contact with "ECSAINE" were marked, and their areas were measured. The flatness (%) was obtained from the following formula:

100×(1−(Sum of areas of marked portions)/(Area of base film before heat treatment))

When the width of the base film was less than 50 mm, 100 cm long straight lines were drawn in the longitudinal direction at 3 mm or 5 mm intervals in the range between transverse lines drawn at 50 mm from both the ends of the base film with a length of 110 cm. The base film was then heat-treated as described in (2) above. The heat treated film was spread on section paper, and the maximum deviation of each end of the base film or each longitudinal straight line from the corresponding straight line on the section paper was obtained, and the flatness was calculated from the curve ratio defined by the following formula. Of the values calculated for all the ends and longitudinal straight lines, the largest value was identified as the flatness.

(Deviation)/(Length of film or straight line before heat treatment)× 100 (%)

(4) Ionic impurity content

Cations and anions were measured according to the following (4-1) and (4-2), and the sum was identified as the ionic impurity content.

(4-1) Qualification and determination of metallic ions

Twenty grams of a base film was accurately weighed, and refluxed in hot water for 24 hours, and ionic compounds were extracted. The extract was filtered, and the filtrate was evaporated to dryness. The residue was dissolved into nitric acid or hydrofluoric acid, and dilute nitric acid was added to achieve a constant volume. Of the constant volume solution, K and Na were analyzed by atomic absorption spectrophotometry, and the other ingredients were analyzed by ICP emission spectral analysis. The unit ppm is µg/g.

(4-2) Amount of anions

Twenty grams of a base film were accurately weighed, refluxed in hot water for 24 hours, and ionic compounds were extracted. The extract was determined by ion chromatography based on a calibration curve prepared beforehand. The unit ppm is µg/g.

(5) Oligomer content and molecular weight distribution

A film was dissolved in a solvent. A low angle laser light scattering photometer (LALLS) and a differential refractometer (RI) were installed in a gel permeation chromatograph (GPC). In the GPC, light scattering intensities and refractive index differences of size-fractionated polymer solutions were measured with the lapse of elution time, and the molecular weight and content of the solute were sequentially calculated. Finally, the absolute molecular weight of the polymer was obtained by calculation. For calibration of absolute molecular weight, diphenylmethane was used.

As a simple method, the oligomer content can also be obtained by simply collecting fractions having a molecular weight of 1000 or less in size-fractionated solutions and removing the solvent.

(6) Printing quality

Each base film was corona-treated on the surface on which a coloring material layer is to be formed, and an anchor layer made of an acrylic resin was formed.

Then, mixtures consisting of any of four sublimatable dyes of yellow, cyan, magenta and black and a binder were applied for coating and dried, to form a four-color layer of coloring material.

| | |
|---|---|
| Dye | 10 parts by weight |
| Polyvinylbutyral resin containing particles | 20 parts by weight |
| Toluene | 90 parts by weight |
| Methyl ethyl ketone | 90 parts by weight |

The sheet was used to carry out full color printing using a printing machine with a JIS standardized size A4 edge type line head by applying a power of 20 W/mm$^2$, with the pulse duration kept at 4 ms and at a pressure of 110 g/cm. The printing quality was evaluated according to the following criterion.

⊚⊚: Particularly Excellent
⊚: Excellent
○: Good
Δ: Equivalent or poor to some extent
X: Poor In Examples 1 to 8 and Comparative Examples 1 to 6, the abbreviations of raw materials used in the examples are as follows:

Aromatic diamine components
MA: Metaphenylenediamine
CPA: Chloroparaphenylenediamine
DPX: 2,5'-dimethylparaphenylenediamine
DMB: 3,3'-dimethylbenzidine
DOB: 3,3'-dimethoxybenzidine
DPE: 4,4'-diaminodiphenyl ether
Acid chloride components
TPC: Terephthaloyl dichloride
IPC: Isophthaloyl dichloride
CTPC: Chloroterepthaloyl dichloride Example 1

As aromatic diamine components, 80 mol % of CPA and 20 mol % of DPE were dissolved into N-methylpyrrolidone (NMP), and 100 mol % of CTPC was added to the solution. The mixture was stirred for 2 hours at a high speed in the beginning with the speed gradually lowered, to complete polymerization. It was neutralized by lithium hydroxide, to obtain an aromatic polyamide solution having a polymer concentration of 10 wt %.

Then, a slurry of silica particles with an average particle size of 0.8 μm dispersed in NMP was added to the aromatic polyamide solution, in an amount of the silica particles of 1.0 wt % based on the weight of the polymer, and the mixture was homogeneously dispersed.

The polymer solution was fed through a 20 μm cut filter, and was allowed to flow on an SUS belt from a die controlled at a temperature of 50° C., and heated in a 180° C. dryer for 2 minutes, to evaporate the solvent, and a film retaining its form was produced and continuously removed from the belt. In this case, ten points near, and upstream of the die, the die exit were monitored by thermocouples, which points were located in the transverse of the die, and it was found that the temperature difference between any two points optionally selected from them was within 3° C. In addition in the dryer, forty points near the film, which points were located in such a manner that four points spaced from one another could make a line in the transverse direction of the film and than ten lines made by the four points and spaced from one another could locate in the longitudinal direction of the film, were monitored by thermocouples, and it was found that the temperature difference between any two points optionally selected from the four points in respective lines in the transverse direction of the film were within 3° C.

Subsequently, in the extraction step for removing solvent for the polyamide and salt, the film was introduced into water baths kept at 30° C., equipped with mechanisms for providing forced circulation, having respective water/NMP concentration ratios of 7/3, 8/2, 9/1 and 10/0 and with nip rolls installed at the outlet of the final bath, to extract the remaining solvent and inorganic salts. In this case, the film was stretched by rollers to 1.2 times in the longitudinal direction.

Then, the film was dried to remove water and heat-treated at 285° C. by a tenter, to obtan a 6 μm thick aromatic polyamide film. During the heat treatment, the film was stretched to 1.2 times in the transverse direction, heat-treated at a constant tension at 300° C., and gradually cooled at a rate of 20° C./sec. In addition in the tenter, forty points near the film, which points were located in such a manner that four points spaced from one another could make a line in the transverse direction of the film and that ten lines made by the four points spaced from one another could locate in the longitudinal direction of the film, were monitored by thermocouples, and it was found that the temperature difference between any two points optionally selected from the four points in respective lines in the transverse direction of the film were within 3° C.

The film had a Young's modulus $E_{MD}$ of 9.8 GPa, a Young's modulus $E_{TD}$ of 8.33 GPa, an elongation in the longitudinal direction of 47%, a % thermal dimension change of 0.2%, a flatness after heat treatment of 75%, an oligomer content less than 0.2 wt %, an Mw/Mn value of 2.4, an ionic impurity content less than 10 ppm, and a surface roughness Ra of the base on the surface on which the layer of coloring material was not formed of 40 nm.

The image transfer material obtained using the film gave a printing quality rated as excellent, and showed little deterioration even after printing many times. Moreover, the processing to obtain the image transfer material was free from any particular problem.

Example 2

An aromatic polyamide film was obtained in the manner described in Example 1, except that the film was stretched to 1.25 times in the baths within which the extraction step for removal of solvent and salt was performed.

The film had a Young's modulus $E_{MD}$ of 10.29 GPa, a Young's modulus $E_{TD}$ of 8.03 GPa, an elongation in the longitudinal direction of 40%, a % thermal dimensional change of 0.2%, a flatness after heat treatment of 65%, an oligomer content of less than 0.2 wt %, an Mw/Mn value of 2.4, an ionic impurity content of less than 10 ppm, and a surface roughness Ra of the base on the surface on which the layer of coloring material was not formed of 40 nm.

The image transfer material obtained using the film was good in printing quality, and showed little deterioration even after printing many times. The pulse duration was increased by 1 ms from the standard condition mentioned above, but little elongation was observed, to show that it had thermal allowance. Moreover, the processing to obtain the image transfer material was free from any particular problem, and slittability was better compared with Example 1, on the contrary, while the ratio that defects in production occured was declined.

Example 3

Polymerization was carried out as described in Example 1, except that CTPC was added in five portions, taking 40 minutes, and particles were added. A 6 μm thick aromatic polyamide film was then obtained in the manner described in Example 1, except that the film was not stretched in the extraction step, and the film was then stretched in the tenter to 1.2 times in the longitudinal direction and to 1.1 times in the transverse direction and heat-treated with 1% relaxation.

The film had a Young's modulus $E_{MD}$ of 9.31 GPa, a Young's modulus $E_{TD}$ of 8.33 GPa, an elongation in the longitudinal direction of 28%, a % thermal dimensional change of 0.1% or less, a flatness after heat treatment of 80% or more, an oligomer content less than 0.2%, an Mw/Mn value of 3.7, an ion impurity content less than 10 ppm, and a surface roughness Ra of the base on the surface on which the layer coloring material was not formed of 40 nm.

The image transfer material obtained using the film gave a printing quality rated as excellent, and showed little deterioration even after printing many times. The processing into the image transfer material was also free from any particular problem. However, the base film was rather fragile and low in production process efficiency.

Example 4

Polymerization was carried out as described in Example 1, except that the stirring speed was not controlled during polymerization, and particles were added. A 6 μm thick aromatic polyamide film was then obtained as described in Example 1, except that a pressure roll with a suction mechanism was used instead of nip rolls at the outlet of the final bath in the extraction step for solvent and salt removal, that no stretching was effected in the extraction step and that the film was stretched in the tenter to 1.2 times in the longitudinal direction and to 1.1 times in the transverse direction.

The film had a Young's modulus $E_{MD}$ of 10.29 GPa, a Young's modulus $E_{TD}$ of 8.82 GPa, an elongation in the longitudinal direction of 42%, a % thermal dimensional change of 0.2%, a flatness after heat treatment of 75%, an oligomer content of 0.7 wt %, an Mw/Mn value of 3.2, an ion impurity content less than 10 ppm, and a surface roughness Ra of the base on the surface on which the layer of coloring material was not formed of 40 nm.

The image transfer material obtained using the film gave a printing quality rated as excellent, and showed little deterioration even after printing many times. However, as the number of printing times was increased, it was felt that the image transfer material tended to accompany the platen roller and feeder roller.

Example 5

Polymerization was carried out to obtain a polymer solution as described in Example 1. The polymer solution was divided into two parts. To the first part, a slurry of silica particles with an average particle size of 0.3 μm dispersed in NMP was added in an amount of 2 wt % based on the weight of the polymer, and to the second part, a slurry of silica particles with an average particle size of 1.2 μm dispersed in NMP was added in an amount of the silica particles of 0.5 wt % based on the weight of the polymer. The mixtures were homogeneously dispersed.

Subsequently the first and second parts of the polymer solution were cast while being laminated by a laminating die, and a 6 μm thick aromatic polyamide film was obtained as described in Example 3, except that a pressure roll with a suction mechanism was used instead of nip rolls in the extraction step, and that the film was stretched to 1.25 times in the longitudinal direction and to 1.1 times in the width direction. A layer of coloring material was formed on the film on the surface provided by the first part of the laminated polymer solution.

The film had a Young's modulus $E_{MD}$ of 10.78 GPa, a Young's modulus $E_{TD}$ of 8.04 GPa, an elongation in the longitudinal direction of 38%, a % thermal dimensional change of 0.1% or less, a flatness after heat treatment of 80% or more, an oligomer content less than 0.2 wt %, an Mw/Mn value of 2.5, an ion impurity content less than 10 ppm, a surface roughness Ra of the base on the surface on which the layer of coloring material was not formed of 300 nm, and a surface roughness Ra of the base on the surface on which the layer of coloring material was formed of 20 nm.

The image transfer material obtained using the film gave a printing quality rated as particularly excellent, and showed no deterioration at all even after printing many times. The processability was good, and the ratio that defects occured was decreased remarkably.

Example 6

As aromatic diamine components, 40 mol % of DPX, 40 mol % of DOB and 20 mol % of DPE were dissolved, and 100 mol % of TPC was added. The mixture was stirred for 2 hours at a high speed in the beginning with the speed gradually lowered, to complete polymerization. It was neutralized by lithium hydroxide, to obtain an aromatic polyamide solution having polymer concentration of 7 wt %.

To the aromatic polyamide solution, a slurry with silica particles with an average particle size of 0.8 μm dispersed in NMP was added in an amount 1.0 wt % based on the weight of the polymer, and the mixture was homogeneously dispersed.

The polymer solution was fed through a 20 μm cut filter, allowed to flow on an SUS belt from a die controlled at a temperature of 60° C., and heated in a 170° C. dryer for 2 minutes, to evaporate the solvent. A film which retained its form was produced and continuously removed from the belt. In this case, ten points near, and upsteam of the die, the die exit were monitored by thermocouples, which points were located in the transverse direction of the die, and it was found that the temperature difference between any two points optionally selected from them was within 3° C. In addition in the dryer, forty points near the film, which points were located in such a manner that four points spaced from one another could make a line in the transverse direction of the film and that ten lines made by the four points and spaced from one another could locate in the longitudinal direction of the film, were monitored by thermocouples, and it was found that the temperature difference between any two points optionally selected from the four points in respective lines in the transverse direction of the film were within 3° C.

The film was introduced into water baths kept at 30° C., equipped with mechanisms for providing forced circulation, having respective water/NMP concentration ratios of 7/3, 8/2, 9/1 and 10/0 and with a pressure roll with a suction mechanism installed at the outlet of the final bath, to extract the remaining solvent and inorganic salts.

Then, the film was dried to remove water and heat-treated at 280° C. by a tenter, to obtain a 6 μm thick aromatic polyamide film. During the heat treatment, the film was stretched to 1.2 times in the longitudinal direction and to 1.1 times in the transverse direction, heat-treated at 290° C. at a constant tension, and gradually cooled at a rate of 20° C./sec. In addition in the tenter, forty points near the film, which points were located in such a manner that four points spaced from one another could make a line in the transverse direction of the film and that ten lines made by the four points spaced from one another could locate in the longitudinal direction of the film, were monitored by thermocouples, and it was found that the temperature difference between any two points optionally selected from the four points in respective lines in the transverse direction of the film were within 3° C.

The film had a in Young's modulus $E_{MD}$ of 9.8 GPa, a Young's modulus $E_{TD}$ of 8.33 GPa, an elongation in the longitudinal direction of 35%, a % thermal dimensional change of 0.1%, a flatness after heat treatment of 75%, an oligomer content less than 0.2 wt %, an Mw/Mn value of 2.8, an ion impurity content less than 10 ppm, and a surface roughness Ra of the base on the surface on which the layer of coloring material was not formed of 40 nm.

The image transfer material obtained using the film gave a printing quality rated as excellent and showed little deterioration even after printing many times. The processing into the image transfer material was also free from any particular problem.

Example 7

Polymerization was carried out as described in Example 6, except that 35 mol % of DPX, 30 mo % of DMB, 20 mol % of 2,2'-dimethylbenzidine, 15 mol % of DPE and 100 mol % of TPC were used as monomers, and particles were added. A 6 μm thick aromatic polyamide film was then obtained, except that 1% relaxation was used during heat treatment.

The film had a Young's modulus $E_{MD}$ of 9.8 GPa, a Young's modulus $E_{TD}$ of 8.33 GPa, an elongation in the longitudinal direction of 35%, a % thermal dimensional change of 0.1% or less, a flatness after heat treatment of 80% or more, an oligomer content less than 0.2 wt %, a Mw/Mn value of 2.8, an ionic impurity content less than 10 ppm, and a surface roughness Ra of the base on the surface on which the coloring material layer was not formed of 40 nm.

The image transfer material obtained using the film gave a printing quality rated as particularly excellent and showed no deterioration even after printing many times. The processing into the image transfer material was free from any particular problem.

Example 8

Polymerization was carried out as described in Example 1, except that 70 mol % of CPA, 30 mol % of DPE and 100 mol % of CTPC were used as monomers, and particles were added similarly. A 6 μm thick aromatic polyamide film was then obtained as described in Example 6, except that the stretching temperature was 285° C., that the stretching ratios were 1.15 times in the longitudinal direction and 1.1 times in the transverse direction, and the heat treatment temperature was 290° C.

The film has a Young's modulus $E_{MD}$ of 7.05 GPa, a Young's modulus $E_{TD}$ of 7.64 GPa, an elongation in the longitudinal direction of 47%, a % thermal dimensional change of 0.6%, a flatness after heat treatment of 75%, an oligomer content less than 0.2 wt %, an Mw/Mn value of 2.5, an ionic impurity content less than 10 ppm, and a surface roughness Ra of the base on the surface on which the layer coloring material was not formed of 40 nm.

The image transfer material obtained using the film printing quality rated as good, but there was no allowance in temperature of practical use. It was feared that the performance after many repeated printing operations would decline. The processing into the image transfer material was free from any particular problem, but compared with other examples, processing at higher speed showed a tendency to cause film breakage.

Comparative Example 1

Polymerization was carried out as described in Example 1, except that 100 mol % of MA, 50 mol % of IPC and 50 mol % of TPC were used as monomers, and particles were added similarly. A 6 μm thick aromatic polyamide film was then obtained as described in Example 6, except that the stretching temperature was 270° C. and that the heat treatment temperature was 285° C.

The film had a Young's modulus $E_{MD}$ of 6.37 GPa, a Young's modulus $E_{TD}$ of 5.4 GPa, an elongation in the longitudinal direction of 47%, a % thermal dimensional change of 2.5%, a flatness after heat treatment of 65%, an oligomer content less than 0.2 wt %, an Mw/Mn value of 2.7, an ionic impurity content less than 10 ppm, and a surface roughness Ra of the base on the surface on which the layer of coloring material was not formed of 40 nm.

The image transfer material obtained using the film was elongated, and wrinkled and folded frequently during printing, and the printing quality was too low to allow practical use.

Comparative Example 2

Polymerization was carried out as described in Example 1, except that 60 mol % of CPA, 40 mol % of DPE and 100 mol % of CTPC were used as monomers, and particles were added similarly. A 6 μm thick aromatic polyamide film was then obtained as described in Example 6, except that the stretching temperature was 270° C., that the elongation ratios were 1.1 times both in the longitudinal and transverse directions, and that the heat treatment temperature was 285° C.

The film had a Young's modulus $E_{MD}$ of 6.66 GPa, a Young's modulus $E_{TD}$ of 6.66 GPa, an elongation in the longitudinal direction of 49%, a % thermal dimensional change of 1.1%, a flatness after heat treatment of 70%, an oligomer content less than 0.2 wt %, an Mw/Mn value of 2.4, an ionic impurity content less than 10 ppm, and a surface roughness Ra of the base on the surface on which the layer of coloring material was not formed of 40 nm.

The image transfer material obtained using the film was elongated, and wrinkled and folded during printing though not so much as in Comparative Example 1. The printing quality was too low to allow practical use.

Comparative Example 3

Polymerization was carried out as described in Example 1, and a film was formed as described in Example 4 except that the temperature of the die was controlled by monitoring at only one central portion of the die while the polymer solution was discharged. Furthermore, the dryer was stopped, and casting only was effected. The thickness irregularity of the cast film was measured and found to exceed 10%.

The film had a Young's modulus $E_{MD}$ of 10.29 GPa, a Young's modulus $E_{TD}$ of 8.82 GPa, an elongation in the longitudinal direction of 42%, a % thermal dimensional change of 0.2%, a flatness after heat treatment less than 60%, an oligomer content less than 0.2 wt %, an Mw/Mn value of 2.5, an ionic impurity content less than 10 ppm, and a surface roughness Ra of the base on the surface on which the layer of coloring material was not formed of 40 nm.

The image transfer material obtained by using the film was wrinkled and folded during printing. The printing quality was too low to allow practical use.

Comparative Example 4

Polymerization was carried out as described in Example 1, except that the mechanisms for providing forced circulation present in the extraction baths for removal of solvent and salt were stopped, and a film was formed as described in Example 4.

The film had Young's modulus $E_{MD}$ of 10.29 GPa, a Young's modulus $E_{TD}$ of 8.82 GPa, an elongation in the longitudinal direction of 42%, a % thermal dimensional change of 0.2%, a flatness after heat treatment less than 60%, an oligomer content less than 0.2 wt %, an Mw/Mn value of 2.5, an ionic impurity content less than 10 ppm, and a surface roughness Ra of the base on the surface on which the layer of coloring material was not formed of 40 nm.

The image transfer material obtained using the film was wrinkled and folded during printing though not so badly as in Comparative Example 3. The printing quality was too low to allow practical use.

Comparative Example 5

Polymerization was carried out as described in Example 1, except that the pressure roll with a suction mechanism at the outlet of the final bath in the extraction step for removal solvent and salt was removed, and a film was formed as described in Example 4.

The film had a Young's modulus $E_{MD}$ of 10.29 GPa, a Young's modulus $E_{TD}$ of 8.82 GPa, an elongation in the longitudinal direction of 42%, a % thermal dimensional change of 0.3%, a flatness after heat treatment less than 60%, an oligomer content of 0.3 wt %, an Mw/Mn value of 2.7, an ionic impurity content of 15 ppm, and a surface roughness Ra of the base on the surface on which the layer of coloring material was not formed of 40 nm.

The image transfer material obtained using the film was more wrinkled and folded during printing than in Comparative Example 3. The printing quality was too low to allow practical use. The thermal head was somewhat colored.

Comparative Example 6

Polymerization was carried out as described in Example 1, and a film was formed as described in Example 4 except that the temperature of each section of the tenter was controlled by monitoring only at one point in the stretching and heat treatment step. In this case, the temperature irregularity in the section was measured by other thermocouples and found to be about 15° C. in the transverse direction of the film.

The film had a Young's modulus $E_{MD}$ of 10.29 GPa, a Young's modulus $E_{TD}$ of 8.82 GPa, an elongation in the longitudinal direction of 42%, a % thermal dimensional change of 0.3%, a flatness after heat treatment less than 60%, an oligomer content of 0.2 wt %, an Mw/Mn value of 2.5, an ionic impurity content less than 10 ppm, and a surface roughness Ra of the base on the surface on which the layer of coloring material was not formed of 40 nm.

The image transfer material obtained using the film was wrinkled and folded during printing though not so badly as in Comparative Example 4. The printing quality was too low to allow practical use.

The polymer compositions in Table 1 are as follows:

Composition 1: CPA/DPE/CTPC=80/20/100

Composition 2: DPX/DOB/DPE/TPC=40/40/20/100

Composition 3: DPX/DMB/2,2'-dimethylbenzidine/DPE/TPC=35/30/20/15/100

Composition 4: CPA/DPE/CTPC=70/30/100

Composition 5: MA/IPC/TPC=100/50/50

Composition 6: CPA/DPE/CTPC=60/40/100

TABLE 1

|  | Composition | young's modulus (MD/TD:GPa) | Dimensional change (%) | Flatness after heat treatment (%) | Oligomer content (WT %) | Mw/Mn | Printing quality |
| --- | --- | --- | --- | --- | --- | --- | --- |
| Example 1 | 1 | 9.8/8.33 | 0.2 | 75 | less than 0.2 | 2.4 | ○ |
| Example 2 | 1 | 10.29/8.03 | 0.2 | 65 | less than 0.2 | 2.4 | ○–Δ |
| Example 3 | 1 | 9.31/8.33 | 0.1 or less | 80 or more | less than | 3.7 | ◎ |
| Example 4 | 1 | 10.29/8.82 | 0.2 | 75 | 0.7 | 3.2 | ○ |
| Example 5 | 1 | 10.78/8.04 | 0.1 or less | 80 or more | less than 0.2 | 2.5 | ◎◎ |
| Example 6 | 2 | 9.8/8.33 | 0.1 | 75 | less than 0.2 | 2.8 | ○ |
| Example 7 | 3 | 9.8/8.33 | 0.1 or less | 80 or more | less than 0.2 | 2.8 | ◎ |
| Example 8 | 4 | 7.05/7.64 | 0.6 | 75 | less than 0.2 | 2.5 | ○ |
| Comparative Example 1 | 5 | 6.37/5.4 | 2.5 | 65 | less than 0.2 | 2.7 | X |
| Comparative Example 2 | 6 | 6.66/6.66 | 1.1 | 70 | less than 0.2 | 2.4 | X |
| Comparative Example 3 | 1 | 10.29/8.82 | 0.2 | less than 60 | less than 0.2 | 2.5 | X |

TABLE 1-continued

|  | Composition | young's modulus (MD/TD:GPa) | Dimensional change (%) | Flatness after heat treatment (%) | Oligomer content (WT %) | Mw/Mn | Printing quality |
| --- | --- | --- | --- | --- | --- | --- | --- |
| Comparative Example 4 | 1 | 10.29/8.82 | 0.2 | less than 60 | less than 0.2 | 2.5 | X |
| Comparative Example 5 | 1 | 10.29/8.82 | 0.3 | less than 60 | 0.3 | 2.7 | X |
| Comparative Example 6 | 1 | 10.29/8.82 | 0.3 | less than 60 | 0.2 | 2.5 | X |

What is claimed is:

1. An image transfer material for thermal recording comprising a base film and, on one surface of the base film, a layer of colouring material, which base film comprises an aromatic polyamide and has a Young's modulus $E_{MD}$ in the longitudinal direction, measured at 20° C. and at a relative humidity of 60%, of at least 6.86 GPa, and which base film is in a substantially flat condition and is capable of maintaining a substantially flat condition after heat treatment thereof at 200° C. for 10 minutes in the absence of an applied tension.

2. The image transfer material according to claim 1, wherein the base film has a dimensional stability such that, after heat treatment at 200° C. for 10 minutes in the absence of applied tension, the % dimensional change is 2% or less.

3. The image transfer material according to claim 1 or 2, wherein the base film contains no more than 0.5 wt % of oligomer having a molecular weight of 1000 or less.

4. The image transfer material according to claim 1, wherein the following formula is satisfied:

$$Mw/Mn \leq 4.5$$

where Mw is the weight average molecular weight of the aromatic polyamide of the base film, and Mn is the number average molecular weight thereof.

5. The image transfer material according to claim 1, wherein the following formulae are satisfied:

$$E_{MD} \geq E_{TD} \times 1.1$$

$$E_{TD} \geq 6.86 \text{ GPa}$$

where $E_{TD}$ is the Young's modulus of the base film at 20° C. and at a relatively humidity of 60% in the transverse direction.

6. An image transfer material for thermal recording comprising a base film and, on one surface of the base film, a layer of colouring material, which base film comprises an aromatic polyamide and has a Young's modulus $E_{MD}$ in the longitudinal direction, measured at 20° C. and at a relative humidity of 60%, of at least 6.86 GPa, and which base film is in a substantially flat condition and is capable of maintaining a substantially flat condition after heat treatment thereof at 200° C. for 10 minutes in the absence of an applied tension, and wherein said base film has a width of 100 mm or more and, as the colouring material of the said layer thereof, a dye sublimation type colouring material.

7. An image transfer material for thermal recording comprising a base film and, on one surface of the base film, a layer of colouring material, which base film comprises an aromatic polyamide and has a Young's modulus $E_{MD}$ in the longitudinal direction, measured at 20° C. and at a relative humidity of 60%, of at least 6.86 GPa, and which base film is in a substantially flat condition and is, during formation, controlled such that the difference in temperature across the film is no more than 10° C. at any of two selected points adjacent and upstream of a film forming die, and said base film is capable of maintaining a substantially flat condition after heat treatment thereof at 200° C. for 10 minutes in the absence of an applied tension.

8. An image transfer material for thermal recording comprising a base film and, on one surface of the base film, a layer of colouring material, which base film comprises an aromatic polyamide and has a Young's modulus $E_{MD}$ in the longitudinal direction, measured at 20° C. and at a relatively humidity of 60%, of at least 6.86 GPa, and which base film is in a substantially flat condition and is, during formation adjacent a die exit, controlled such that the difference in thickness of said film across its width is no more than 10%, and said base film is capable of maintaining a substantially flat condition after heat treatment thereof at 200° C. for 10 minutes in the absence of an applied tension.

9. An image transfer material for thermal recording comprising a base film and, on one surface of the base film, a layer of colouring material, which base film comprises an aromatic polyamide and has a Young's modulus $E_{MD}$ in the longitudinal direction, measured at 20° C. and at a relative humidity of 60%, of at least 6.86 GPa, and which base film has its temperature controlled during heat treatment thereof such that, at respective points on the film and spaced apart from one another in a transverse direction relative to the film, any variations in temperature to no more than 5% and said base film is in a substantially flat condition and is capable of maintaining a substantially flat condition after heat treatment thereof at 200° C. for 10 minutes in the absence of an applied tension.

10. An image transfer material for thermal recording comprising a base film and, on one surface of the base film, a layer of colouring material, which base film comprises an aromatic polyamide and has a Young's modulus $E_{MD}$ in the longitudinal direction, measured at 20° C. and at a relative humidity of 60%, of at least 6.86 GPa, and which base film has its water vapor content controlled during heat treatment thereof such that, at respective points on the film and spaced apart from one another in a transverse direction relative to the film, any variations in water vapor content to no more than 5% and said base film is in a substantially flat condition and is capable of maintaining a substantially flat condition after heat treatment thereof at 200° C. for 10 minutes in the absence of an applied tension.

11. An image transfer material for thermal recording comprising a base film and, on one surface of the base film, a layer of colouring material, which base film comprises an aromatic polyamide and has a Young's modulus $E_{MD}$ in the longitudinal direction, measured at 20° C. and at a relative humidity of 60%, of at least 6.86 GPa, and which base film is in a substantially flat condition and, contacted with an extraction solvent in a moving condition relative to the film to extract from the film any casting solvent and/or salt remaining in the film, and is capable of maintaining a substantially flat condition after heat treatment thereof at 200° C. for 10 minutes in the absence of an applied tension.

12. The image transfer material according to claim 11, wherein said extraction solvent is removed from the film prior to thermal setting of the film.

\* \* \* \* \*

UNITED STATES PATENT AND TRADEMARK OFFICE
CERTIFICATE OF CORRECTION

PATENT NO.    : 6,177,384 B1
DATED         : January 23, 2001
INVENTOR(S)   : Tsuzuki et al It is certified that error appears in the above-identified patent and that said Letters Patent is hereby corrected as shown below:

<u>Column 3,</u>
At approximately line 29, please change "near" to -- on --.

Signed and Sealed this

Twenty-fifth Day of September, 2001

Attest:

NICHOLAS P. GODICI
*Attesting Officer*          *Acting Director of the United States Patent and Trademark Office*